United States Patent [19]

Koji et al.

[11] Patent Number: 5,396,579
[45] Date of Patent: Mar. 7, 1995

[54] MEMBERSHIP FUNCTION GENERATOR

[75] Inventors: Yukichi Koji; Masanari Oh, both of Fukuoka, Japan

[73] Assignee: Rohm Co., Ltd., Kyoto, Japan

[21] Appl. No.: 993,844

[22] Filed: Dec. 21, 1992

[30] Foreign Application Priority Data

Dec. 28, 1991 [JP] Japan .................................. 3-359889

[51] Int. Cl.$^6$ .............................................. G06G 7/12
[52] U.S. Cl. ........................................ 395/3; 395/900
[58] Field of Search ................ 395/3, 61, 900; 330/69

[56] References Cited

U.S. PATENT DOCUMENTS

| | | | |
|---|---|---|---|
| 3,560,757 | 2/1971 | Pugsley | 250/219 |
| 3,790,897 | 2/1974 | Wheatley, Jr. | 330/69 |
| 4,604,584 | 8/1986 | Kelley | 330/69 |
| 4,694,418 | 9/1987 | Ueno et al. | 395/3 |
| 4,837,725 | 6/1989 | Yamakawa | 395/61 |
| 4,860,243 | 8/1989 | Ueno et al. | 395/3 |
| 5,095,203 | 3/1992 | Sato et al. | 250/222.1 |
| 5,113,366 | 5/1992 | Yamakawa | 364/807 |
| 5,131,071 | 7/1992 | Tsutsumi et al. | 395/900 |
| 5,167,005 | 11/1992 | Yamakawa | 364/807 |
| 5,210,712 | 5/1993 | Saito | 364/825 |

FOREIGN PATENT DOCUMENTS

| | | | |
|---|---|---|---|
| 0450230 | 9/1991 | European Pat. Off. | 395/3 |
| 62-95676 | 5/1987 | Japan . | |
| 1-224802 | 9/1989 | Japan . | |
| 3-286386 | 12/1991 | Japan . | |
| 3-286387 | 12/1991 | Japan . | |

OTHER PUBLICATIONS

Sasaki et al., "A Fuzzy Logic Function Generator (FLUG) Implemented with Current Mode CMOS Circuits", Proc of 21st Int'l Symposium on Multiple Valued Logic, May 26-29, 1991, pp. 356-362.

*Primary Examiner*—Allen R. MacDonald
*Assistant Examiner*—Stuart B. Shapiro
*Attorney, Agent, or Firm*—Oliff & Berridge

[57] ABSTRACT

A membership function generator including a maximum value arithmetic circuit for selecting a maximum voltage of a plurality of first input voltages to output the selected maximum voltage and a minimum value arithmetic circuit for selecting a minimum voltage of a plurality of second input voltages to output the selected minimum voltage. The outputs of the maximum and minimum value arithmetic circuits are input to a differential amplifier circuit. The output of the differential amplifier circuit is used as a membership function. Either at least one of the first input voltages or one of the second input voltages forms the basis of an inference and the remaining input voltages are set to a predetermined reference voltage.

11 Claims, 14 Drawing Sheets

MEMBERSHIP FUNCTION GENERATOR

BACKGROUND OF THE INVENTION

1. Field of the Invention

The present invention relates to a membership function generator in a fuzzy hardware system to be applied to a system of control, recognition, decision making, diagnosis or the like.

2. Description of the Related Arts

Conventionally, for example, when a fuzzy inference is performed, a fuzzy set is defined by a membership function, and in order to process this by an electronic means, a membership function generator is used.

FIG. 11 shows a basic circuit structure of an analog membership function generator operated in a voltage mode. This membership function generator circuit includes two differential amplifier circuits D1 and D2.

The differential amplifier circuit D1 includes a pair of transistors Q11 and Q12 and further includes an output circuit having a current mirror circuit structure composed of two transistors Q13 and Q14 connected to the collector path of the transistor Q11 and three resistors R11, R12 and R13 connected thereto. The emitters of the transistors Q11 and Q12 are coupled with each other via a variable resistor R14, and a constant current source Q1 is connected to the connection of the emitter of the transistor Q11 and the variable resistor R14. An input voltage VIN is supplied to the base of the transistor Q11, and a fixed reference voltage VL1 is supplied to the base of the transistor Q12. An output voltage VO1 is obtained at the collector of the transistor Q14.

Now, assuming that a power voltage is Vcc and the resistance values of the resistor R13 and the variable resistor R14 are RL and RE1, respectively, the relationship between the reference voltage VL1 supplied to the base of the transistor Q12 and the output voltage VO1 obtained at the collector of the transistor Q14 is shown in FIG. 12A. First, when the input voltage VIN is less than the reference voltage VL1, the current $I_o$ of the constant current source Q1 separately flows in the transistor Q11 and the transistor Q12 depending on their input voltage ratio. Hence, with the increase of the input voltage VIN, the output voltage VO1 increases at a gradient of RL/RE1. Next, when the input voltage VIN is at least the reference voltage VL1, all the current $I_o$ of the constant current source Q1 flows in the transistor Q11, and thus the output voltage VO1 is saturated at $I_o$.RL. Such a characteristic is designated an S-type, and a membership function having the S-type characteristic is called an S-type membership function.

The differential amplifier circuit D2 has the same construction as the differential amplifier circuit D1 except that a reference voltage VL2 and the input voltage VIN are conversely given. In this case, a constant current source Q2 is similar to the constant current source Q1. An input/output characteristic of the differential amplifier circuit D2 is shown in FIG. 12B. First, when the input voltage VIN is less than the reference voltage VL2, an output voltage VO2 is saturated at $I_o$.RL. Next, when the input voltage VIN is at least the reference voltage VL2, with the increase of the input voltage VIN, the output voltage VO2 falls at a gradient of −RL/RE2. This characteristic is a Z-type, and a membership function having the Z-type characteristic is called a Z-type membership function.

In a membership function generator circuit, as shown in FIG. 13, a plurality of above-described differential amplifier circuits D1 and D2 are often used in combination with a minimum value arithmetic circuit Q3. In this case, the minimum value arithmetic circuit Q3 is a circuit which inputs a plurality of input values and outputs the minimum value of them. Hence, when the outputs of the differential amplifier circuits D1 and D2 are the respective S-type and Z-type membership functions, the relationship between the input voltage VIN and an output voltage VO3 in the circuit shown in FIG. 13 becomes a trapezoid, as shown in FIG. 12C. In this case, VL1 < VL2. This is called a π-type membership function. This π-type membership function is a membership function most frequently used in a fuzzy system. Further, when VL1 = VL2, an output characteristic becomes a triangle, and a triangular membership function can be obtained.

In the π-type membership function, the waveform is the trapezoid, and the height, the base, the left side gradient and the right side gradient of the trapezoid are $I_o$.RL, VL2 − VL1 + (RE1 + RE2).$I_o$, RL/RE1 and −RL/RE2, respectively. In this case, $I_o$ is the current supplied by the constant current sources Q1 and Q2 in the membership function generator circuit.

In the membership function generator circuit, as described above, the first differential amplifier circuit D1 for generating the S-type membership function and the second differential amplifier circuit D2 for generating the Z-type membership function are used and the minimum value of the outputs of both the differential amplifier circuits D1 and D2 is calculated to generate the π-type membership function or the triangular membership function.

In the membership function generator circuit, the two independent differential amplifier circuits D1 and D2 are used and the gradient of the gradient part of each membership function generated by each differential amplifier circuit depends on the emitter resistor RE1 or RE2 of each differential amplifier circuit. Hence, when the emitter resistors RE1 and RE2 are different from each other, the gradients of the gradient parts of the differential amplifier circuits are different from each other. Thus, when the π-type membership function or the triangular membership function is generated on the basis of the outputs of the differential amplifier circuits D1 and D2, the gadients of both the sides of the trapezoid or the triangle are different from each other.

On the other hand, as the membership function used in the fuzzy system, a membership function symmetrical on the left and right sides or about a vertical line is an overwhelming majority. Hence, in the conventional membership function circuit, by adjusting the emitter resistors so that RE1 = RE2, the gradients of both the sides are made equal to with each other to obtain a symmetrical membership function on the left and right sides. However, an operation for adjusting the values of the emitter resistors RE1 and RE2 for every circuit requires much labor and time, and this adjustment is very troublesome.

Further, when the conditions and characteristics of the operation of the differential amplifier circuits are all equal, it is considered to prepare and use the emitter resistors having an equal value. Actually, there is variation in the operational conditions and characteristics of the differential amplifier circuits. Therefore, in order to use the emitter resistors having an equal value, a quite troublesome adjustment of the differential amplifiers is required.

For example, in the membership function generator circuit shown in FIG. 11, when the resistance value RL of the resistor R13 of the differential amplifier circuit D1 is offset, as shown in FIG. 14, the height ($I_o \cdot RL'$) of the S-type membership function (output voltage VO1) generated in the differential amplifier circuit D1 becomes different from the height ($I_o \cdot RL$) of the Z-type membership function (output voltage VO2) generated in the differential amplifier circuit D2, where RL' is the offset value of the resistor R13 of the differential amplifier circuit D1. Accordingly, when the $\pi$-type membership function is produced from the S-type membership function and the Z-type membership function, as shown by a thick line in FIG. 14, the gradients of both the sides of the $\pi$-type membership function are different from each other and a vertex position is moved from the original position VL2 to a new position VL2'. As a result, the length of the right side in the transverse direction is changed to $I_o \cdot RE2 \cdot (RL'/RL)$. Thus, even when the emitter resistors are adjusted so that RE1=RE2, the obtained trapezoid is asymmetrical on the left and right sides and hence a membership function having the desired form can not be obtained.

Further, when the value RL is externally adjustable, it is sufficient to perform a readjustment so as to be RL'=RL. However, for instance, in the case of the differential amplifier circuits produced in an IC circuit form, the readjustment can not be carried out.

When the value RL is not externally adjustable, it is necessary to adjust either the value RE1 or RE2 so that the trapezoid may be symmetrical on the left and right sides. In this case, the position shift occurs in the right side vertex P of the $\pi$-type membership function, and thus it is necessary to correct this position shift by changing VL2.

In many conventional cases, it is also required to adjust the parameters other than the emitter resistors RE1 and RE2, and it is troublesome to obtain the desired membership function.

SUMMARY OF THE INVENTION

It is therefore an object of the present invention to provide a membership function generator in view of the aforementioned problems, which is capable of obtaining a membership function symmetrical on left and right sides without any adjustment.

In order to achieve the object, according to the present invention, there is provided a membership function generator, comprising:

(a) maximum value selection means such as a maximum value arithmetic circuit for selecting a maximum voltage of a plurality of first input voltages to output the selected maximum voltage;

(b) minimum value selection means such as a minimum value arithmetic circuit for selecting a minimum voltage of a plurality of second input voltages to output the selected minimum voltage; and (c) a differential amplifier circuit for inputting outputs of the maximum value selection means and the minimum value selection means and amplifying a difference of the outputs to output an amplified result as a membership function.

In such a construction, a difference between the maximum value of the first input voltages and the minimum value of the second input voltages are amplified to output the amplified difference as the membership function. Hence, by setting the first input voltage and the second input voltage, a gradient increase and a gradient decrease of a $\pi$-type or triangular membership function can be made equal.

As such settings, first, the following setting is described. That is, the input voltage to form the basis of an inference (hereinafter referred to as the "inference-input") is input as at least one of the first input voltages and the remaining first input voltages are set at a predetermined first reference voltage. Also, the inference-input is input as at least one of the second input voltages and the remaining second input voltages are set at a predetermined second reference voltage. The second reference voltage is at least the first reference voltage.

In such settings, in a range where at the inference-input is lower than the first reference voltage, the output of the maximum value selection means becomes the first reference voltage and the output of the minimum value selection means becomes the inference-input. Hence, in this range, with the increase of the inference-input, the output of the differential amplifier circuit linearly increases. In a range where the inference-input is at least the first reference voltage and is at most the second reference voltage, the output of the maximum value selection means becomes the inference-input and the output of the minimum value selection means also becomes the inference-input. Thus, in this range, the output of the differential amplifier circuit is fixed regardless of the increase of the inference-input. Then, in a range where the inference-input is at least the second reference voltage, the output of the maximum value selection means becomes the inference-input and the output of the minimum value selection means becomes the second reference voltage. Hence, in this range, with the increase of the inference-input, the output of the differential amplifier circuit linearly decreases. At this time, the gradient, that is, the decrease gradient is equal to the gradient in the range where the inference-input is lower than the first reference voltage, that is, the increase gradient, but its sign is inverted. Therefore, without carrying out any adjustment of the membership function generator, the $\pi$-type or triangular membership function symmetrical on the left and right sides can be obtained.

By setting the first reference voltage to a smaller value than the second reference voltage, the $\pi$-type membership function can be obtained, and by setting the first reference voltage to an equal value to the second reference voltage, the triangular membership function (having no flat upper side) can be obtained. Further, the differential amplifier circuit may include: a first transistor having a base to which the output of the maximum value selection means is supplied; a second transistor having a base to which the output of the minimum value selection means is supplied; a constant current source for supplying a predetermined sum value of current to emitters of the first and second transistors; a first resistor interposed between the emitter of the first transistor and the constant current source; a second resistor interposed between the emitter of the second transistor and the constant current source; and a current mirror type output circuit connected to a collector of the second transistor, the current mirror type output circuit having a third resistor for converting a collector current of the second transistor into a voltage to output the voltage as the membership function, when the inference-input is lower than the first reference voltage, an increase gradient of the membership function with respect to the inference-input is (a resistance value of the third resistor)/{(a resistance value of the first resistor)+(a resistance value of the second resistor)}, and, when the inference-input is higher than the second reference voltage, a decrease gradient of the membership function with respect to the input voltage is −(the increase gradient).

As the second embodiment of the setting of the first reference voltage and the second reference voltage, one of the first input voltages is set at a predetermined reference voltage, and the remaining first input voltages are the inference-input. All the second input voltages are the predetermined reference voltage. In this case, there is no change of the differential amplifier output in the low inference-input range described in the first setting and thus a Z-type membership function can be obtained. In this case, the differential amplifier circuit may include: a first transistor having a base to which the output of the maximum value selection means is supplied; a second transistor having a base to which the output of the minimum value selection means is supplied; a constant current source for supplying a predetermined sum value of current to emitters of the first and second transistors; a first resistor interposed between the emitter of the first transistor and the constant current source; a second resistor interposed between the emitter of the second transistor and the constant current source; and a current mirror type output circuit connected to a collector of the second transistor, the current mirror type output circuit having a third resistor for converting a collector current of the second transistor into a voltage to output the voltage as the membership function, and, when the inference-input is higher than the reference voltage, an increase gradient of the membership function with respect to the inference-input is −(a resistance value of the third resistor)/{(a resistance value of the first resistor)+(a resistance value of the second resistor)}.

As the third embodiment of the setting of the first reference voltage and the second reference voltage, all the first input voltages are set at a predetermined reference voltage. Also, at least one of the second input voltages is the predetermined reference voltage, and the inference-input is input as the remaining second input voltages. In this case, in contrast with the second setting, there is no change of the differential amplifier output in the high input voltage range, and an S-type membership function can be obtained. In this case, the differential amplifier circuit may include: a first transistor having a base to which the output of the maximum value selection means is supplied; a second transistor having a base to which the output of the minimum value selection means is supplied; a constant current source for supplying a predetermined sum value of current to emitters of the first and second transistors; a first resistor interposed between the emitter of the first transistor and the constant current source; a second resistor interposed between the emitter of the second transistor and the constant current source; and a current mirror type output circuit connected to a collector of the second transistor, the current mirror type output circuit having a third resistor for converting a collector current of the second transistor into a voltage to output the voltage as the membership function, and, when the inference-input is lower than the reference voltage, a decrease gradient of the membership function with respect to the inference-input voltage is (a resistance value of the third resistor)/{(a resistance value of the first resistor)+(a resistance value of the second resistor)}.

According to the present invention, the membership function generator can be constructed to a reciprocal output type. That is, by providing two output circuit in the differential amplifier circuit, the $\pi$-type or triangular membership function can be obtained from one output circuit and a U-type or triangular membership function can be obtained from another output circuit.

Further, according to the present invention, a predetermined number of membership function generator circuits having the above-described structure can be connected in series to obtain the membership function generator.

BRIEF DESCRIPTION OF THE DRAWINGS

The objects, features and advantages of the present invention will become more apparent from the consideration of the following detailed description, taken in conjunction with the accompanying drawings, in which.

FIG. is 1 a circuit diagram of a first embodiment of a membership function generator according to the present invention.

DESCRIPTION OF THE PREFERRED EMBODIMENTS

Figure 1:
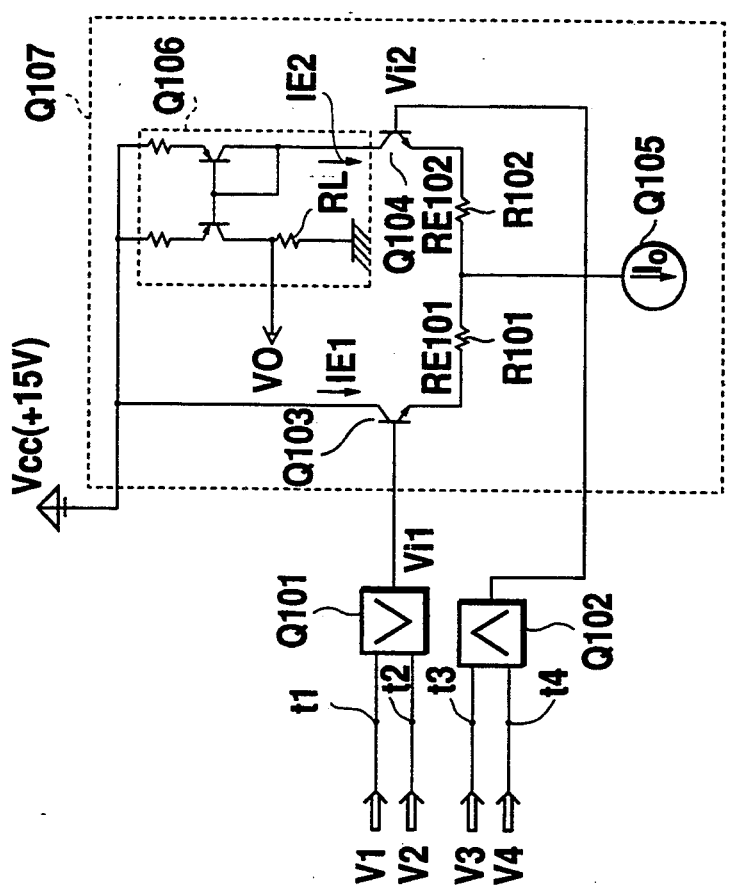

Referring now to the drawings, wherein like reference characters designate like or corresponding parts throughout the views and thus the repeated description thereof can be omitted for brevity, there is shown in FIG. 1 the first embodiment of a membership function generator according to the present invention.

Figure 11:
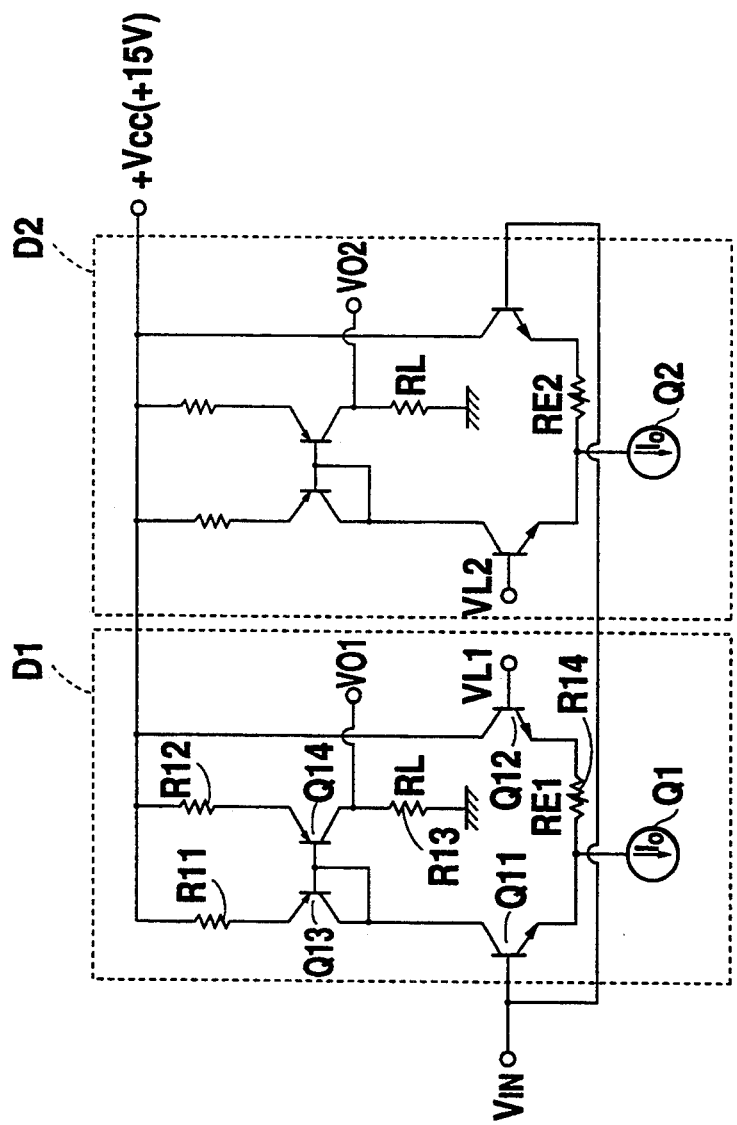
FIG. 11 is a circuit diagram of a basic circuit construction of an analog membership function generator circuit.
Figure 12A:
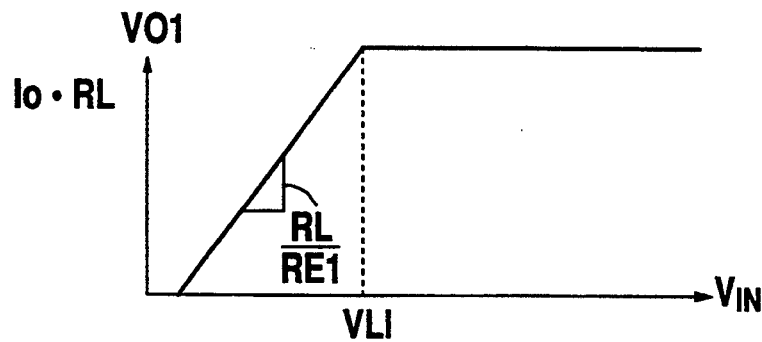
FIGS. 12A to 12C are graphical representations showing various membership functions produced by the membership function generator shown in FIG. 11.
Figure 12B:
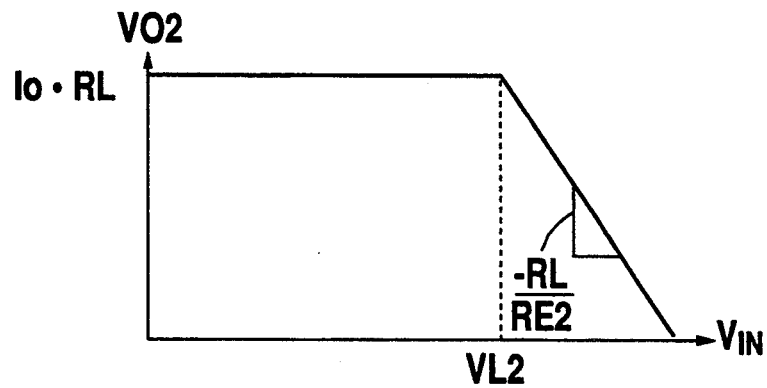
Figure 12C:
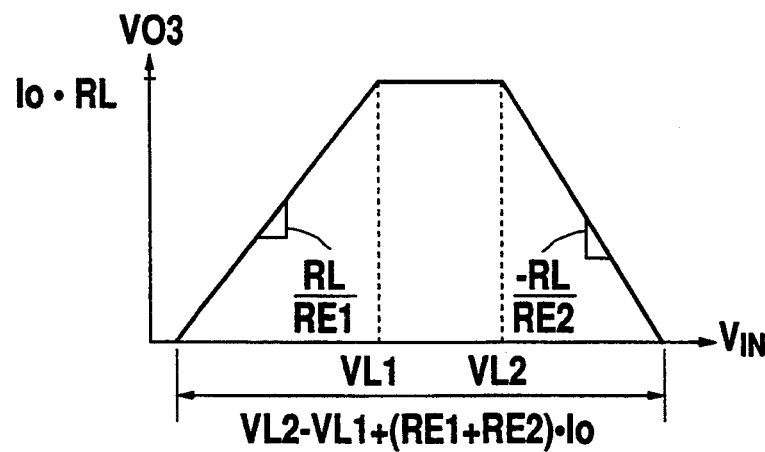
Figure 13:
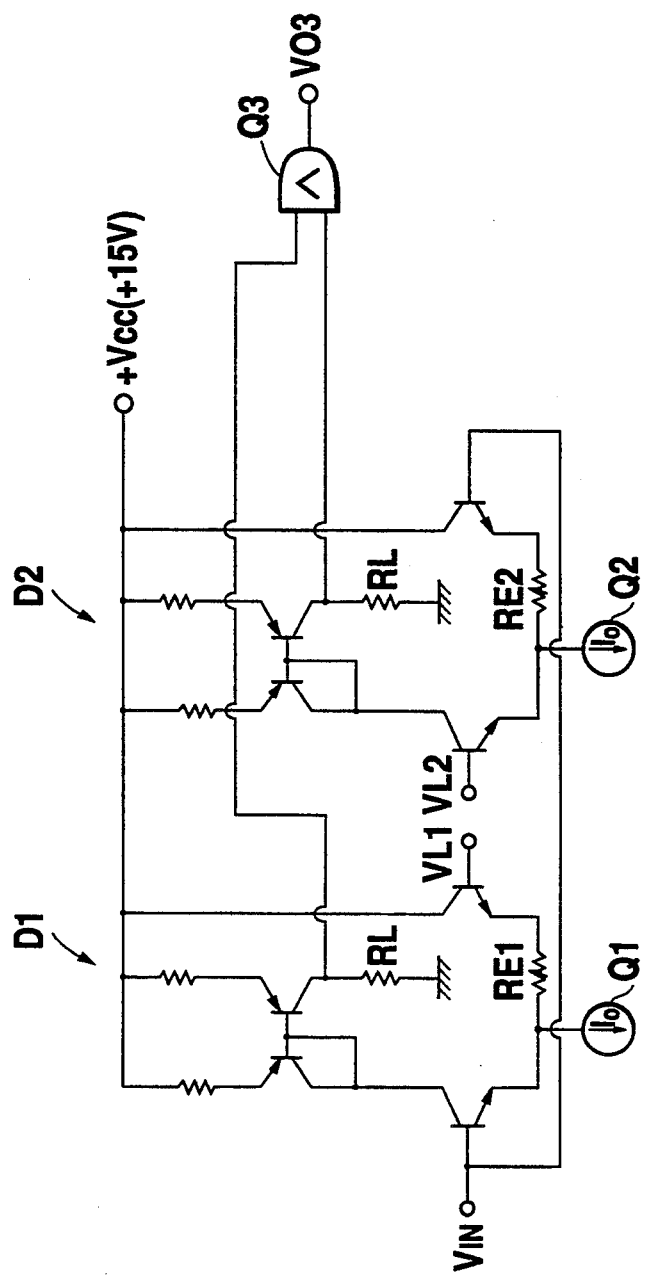
FIG. 13 is a circuit diagram of a membership function generator circuit for producing a $\pi$-type membership function.
Figure 14:
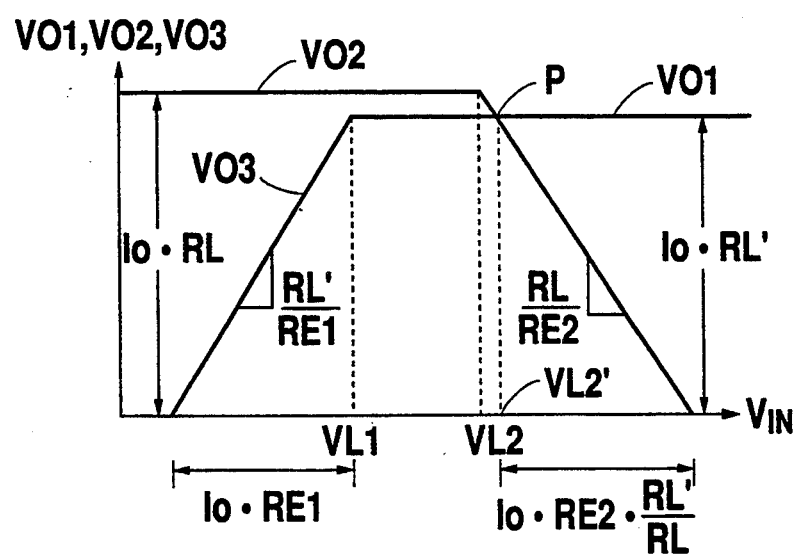
FIG. 14 is a graphical representation showing a distortion of a membership function due to a circuit parameter variation.

In this embodiment, as shown in FIG. 1, a maximum value arithmetic circuit Q101 has a pair of terminals t1 and t2 to which respective input voltages V1 and V2 are supplied, and a minimum value arithmetic circuit Q102 has a pair of terminals t3 and t4 to which respective input voltages V3 and V4 are supplied. The maximum value arithmetic circuit Q101 outputs the maximum one of a plurality of input values, and the minimum value arithmetic circuit Q102 outputs the minimum one of a plurality of input values. An output Vi1 of the maximum value arithmetic circuit Q1O1 is input to one input terminal of a differential amplifier circuit Q107, and an output Vi2 of the minimum value arithmetic circuit Q102 is input to another input terminal of the differential amplifier circuit Q107. The differential amplifier circuit Q107 includes a pair of transistors Q103 and Q104 and an output circuit Q106 having a current mirror circuit structure which is composed of two transistors and three resistors in the same manner as the output circuit having two transistors Q13 and Q14 and three resistors R11, R12 and R13 connected thereto in the differential amplifier circuit D1 or D2 shown in FIG. 11. A pair of resistors R101 and R102 coupled in series are connected to the emitters of the transistors Q103 and Q104 and a constant current source Q105 is connected to the connection of the two resistors R101 and R102. The outputs Vi1 and Vi2 of the two maximum and minimum value arithmetic circuits Q101 and Q102 are input to the bases of the two transistors Q103 and Q104 as the input terminals of the differential amplifier circuit Q107. A power voltage Vcc is applied to the collector of the transistor Q103 and to the collector of the transistor Q104 via the circuit Q106.

Next, the operation of the membership function generator shown in FIG. 1 will be described. In this embodiment, the inputs to the maximum value arithmetic circuit Q1O1 and the minimum value arithmetic circuit Q102 are changed depending on the forms of the desired membership functions.

Figure 2:
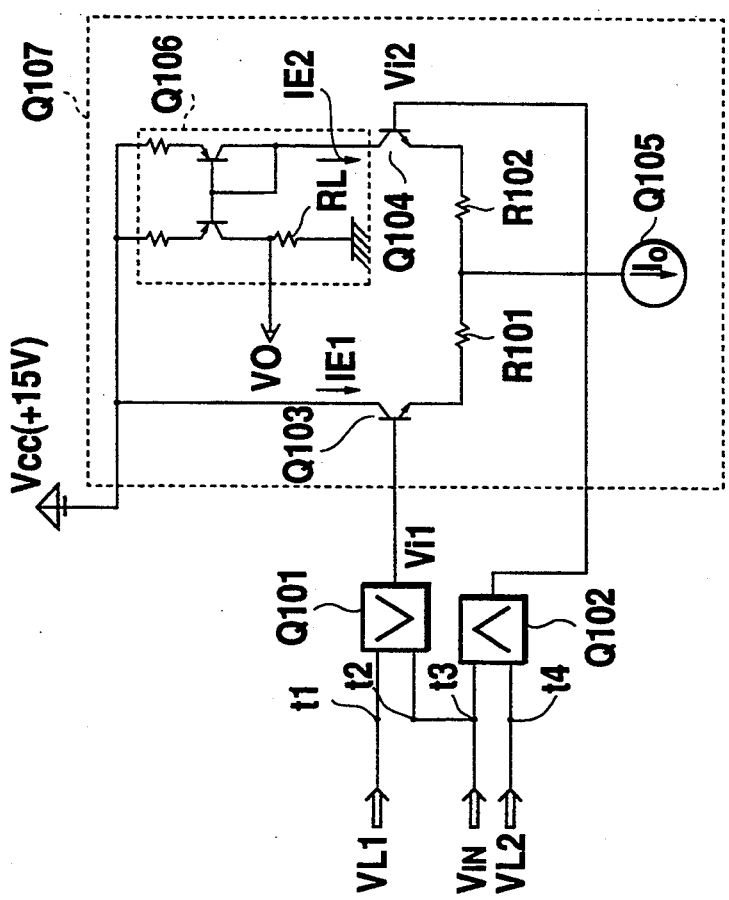
FIG. 2 is a circuit diagram showing an input line connection for generating a $\pi$-type membership function in the membership function generator shown in FIG. 1.

In order to obtain a $\pi$-type membership function, as shown in FIG. 2, the terminal t2 and the terminal t3 are connected, and an inference-input voltage VIN is supplied to the terminals t2 and t3. That is, $VIN=V2=V3$. Also, first and second reference voltages VL1 and VL2 are supplied to the terminals t1 and t4, respectively. That is, $V1=VL1$ and $V2=VL2$. In this case, the outputs Vi1 and Vi2 of the maximum and minimum value arithmetic circuits Q101 and Q102 are represented as follows.

$$Vi1 = \max\{VL1, VIN\} \quad (1)$$
$$= VL1 \text{ (when } VIN < VL1\text{) or}$$
$$VIN \text{ (when } VIN \geq VL1\text{)}$$

$$Vi2 = \min\{VL2, VIN\} \quad (2)$$
$$= VIN \text{ (when } VIN < VL2\text{) or}$$
$$VL2 \text{ (when } VIN \geq VL2\text{)}$$

Figure 3A:
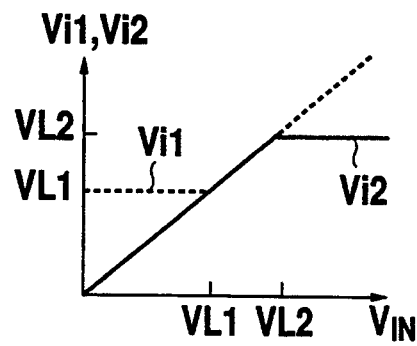
FIGS. 3A to 3D are graphical representations showing various membership functions and methods for generating them.

Hence, for example, when $VL1<VL2$, the relationship between VIN and Vi1 or Vi2 is as shown in FIG. 3A.

Figure 3B:
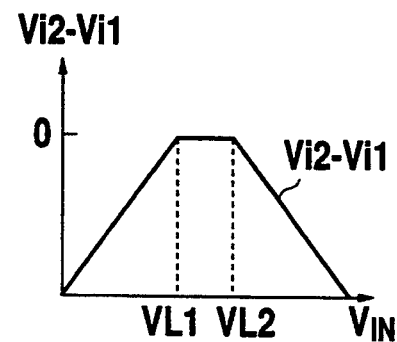

Accordingly, a differential input $Vi2-Vi1$ to the differential amplifier circuit Q107 becomes a trapezoid symmetrical on the left and right sides with vertexes $VIN=VL1$ and $VIN=VL2$, as shown in FIG. 3B.

Figure 3C:
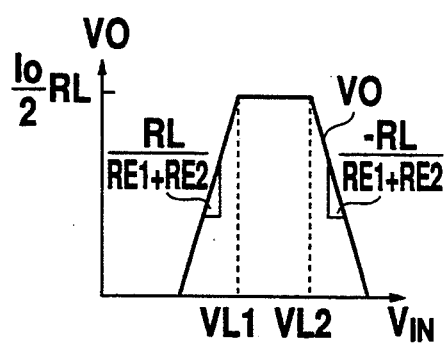

Therefore, an output voltage VO of the differential amplifier circuit Q107 becomes a symmetrical trapezoid on the left and right sides, as shown in FIG. 3C. This trapezoidal output characteristic is called a $\pi$-type membership function. The absolute value of the left and right side gradients of the trapezoid is $RL/(RE101+RE102)$ and the height of the trapezoid is $(I_o/2).RL$ when $RE101=RE102$, wherein RL represents a load resistance value, RE101 and RE102 represent respective resistance values of the resistors R101 and R102, and $I_o$ represents a current value of the constant current source Q105.

Figure 3D:
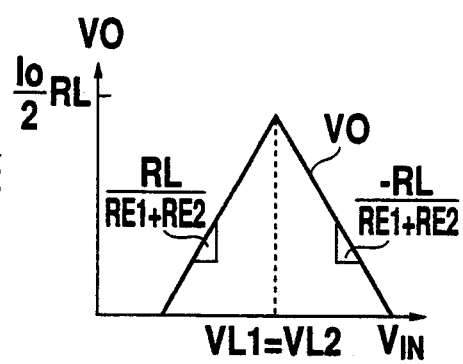

Further, when $VL1=VL2$, as shown in FIG. 3D, an isosceles triangular output characteristic is obtained.

In this embodiment, RE101 and RE102 can be different from each other. In this case, the height of the $\pi$-type membership function is different from $(I_o/2).RL$, but the form of the output voltage VO is still symmetrical on the left and right sides. Further, RE102 can be 0 $\Omega$.

Figure 4:
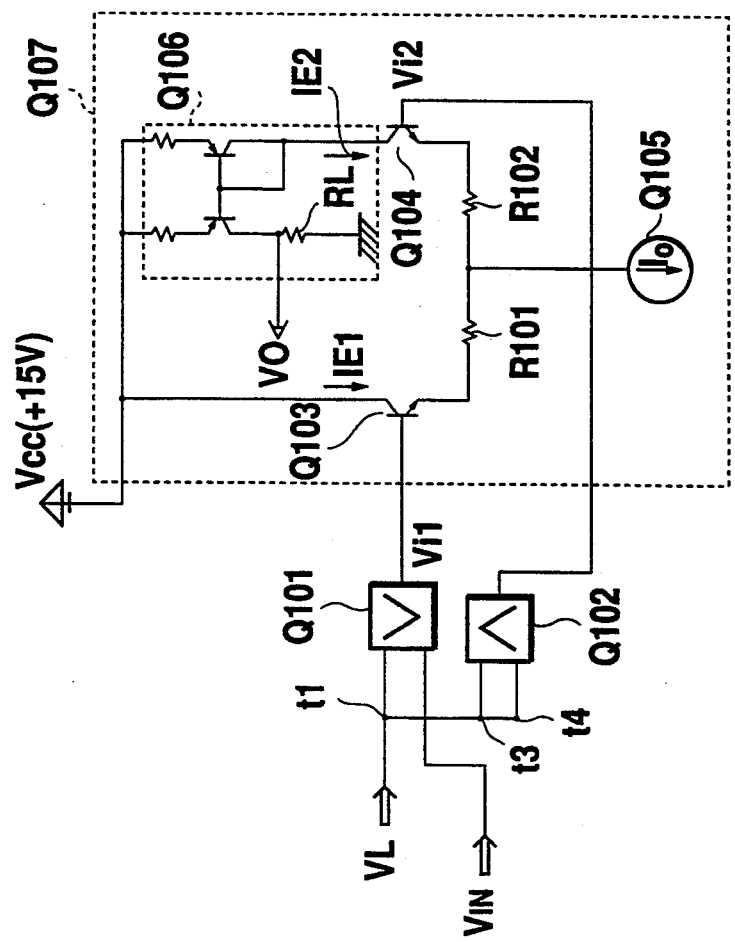
FIG. 4 is a circuit diagram showing another input line connection for generating a Z-type membership function in the membership function generator shown in FIG. 1.
Figure 5A:
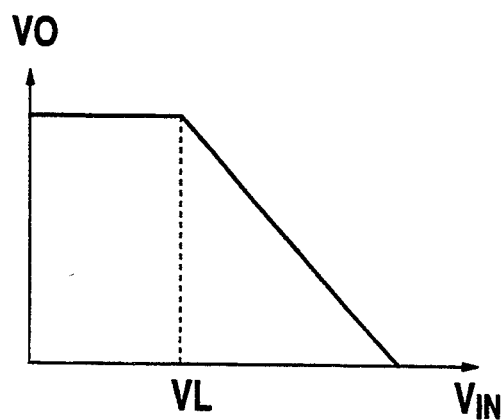
FIGS. 5A and 5B are graphical representations showing Z-type and S-type membership functions.

Next, In the circuit shown in FIG. 1, in order to obtain a Z-type membership function, as shown in FIG. 4, the terminals t1, t3 and t4 are connected together, and a reference voltage VL is supplied to the terminals t1, t3 and t4. The inference-input VIN is supplied to the maximum value arithmetic circuit Q101. In this case, the Z-type membership function shown in FIG. 5A can be obtained. In the case of the circuit shown in FIG. 4, the reference voltage VL can be directly applied to the base of the transistor Q104 without passing through the minimum value arithmetic circuit Q102.

Figure 5B:
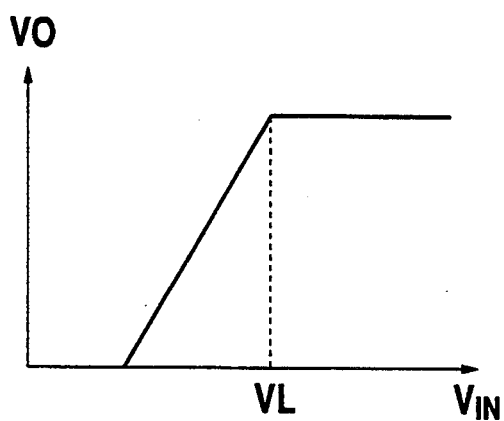
Figure 6:
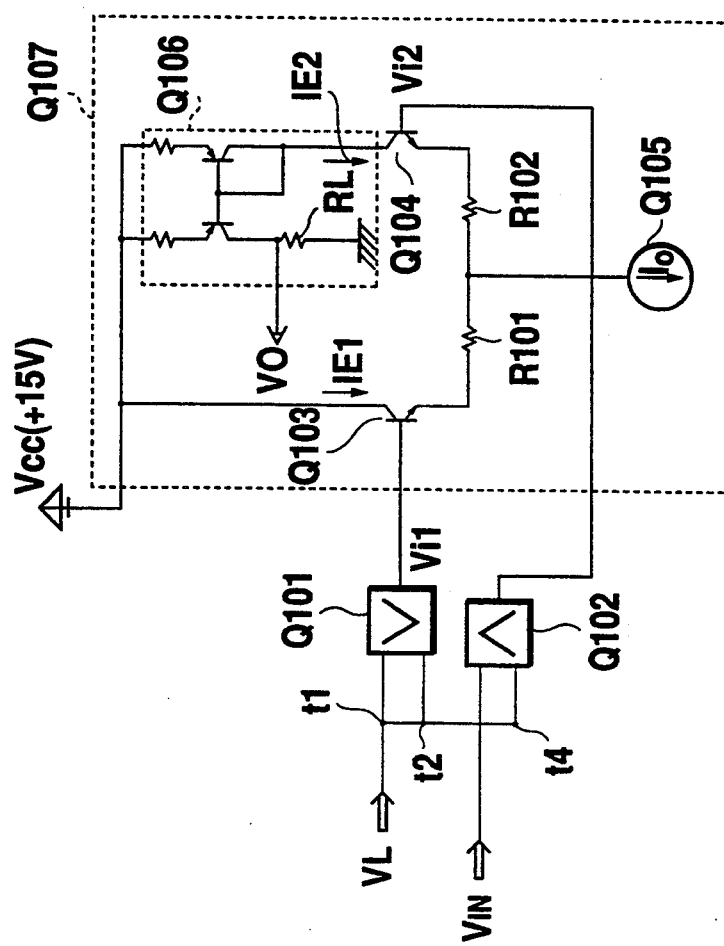
FIG. 6 is a circuit diagram showing a further input line connection for generating an S-type membership function in the membership function generator shown in FIG. 1.

Also, in order to obtain an S-type membership function, as shown in FIG. 6, the terminals t1, t2 and t4 are connected and the reference voltage VL is supplied to the terminals t1, t2 and t4. The inference-input is supplied to the minimum value arithmetic circuit Q102. In this case, the S-type membership function shown in FIG. 5B can be obtained. In the case of the circuit shown in FIG. 6, the reference voltage VL can be directly applied to the base of the transistor Q103 without passing through the maximum value arithmetic circuit Q101.

In both the circuits shown in FIGS. 4 and 6, it is not necessary to determine RE101 and RE102 to the same value. Further, RE102 can be 0 $\Omega$.

Figure 7:
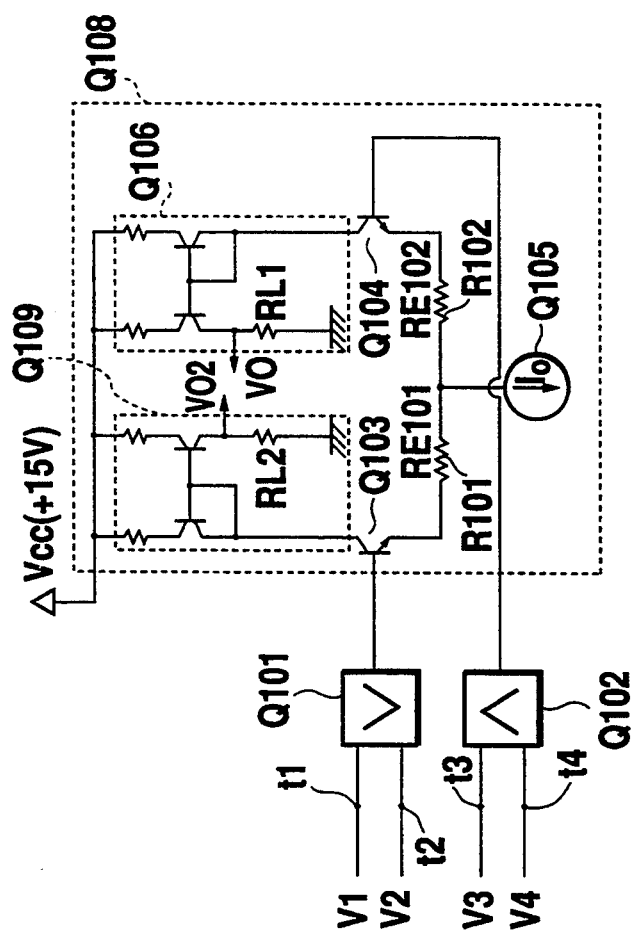
FIG. 7 is a circuit diagram of a second embodiment of a membership function generator according to the present invention.

In FIG. 7, there is shown the second embodiment of a membership function generator according to the present invention, having the same construction as the first embodiment shown in FIG. 1, except that a differential amplifier circuit Q108 further includes an output circuit Q109 having the same construction as the circuit Q106 between the collector of the transistor Q103 and the power voltage Vcc. Resistors RL1 and RL2 are output resistors of the circuit Q106 and Q109, respectively.

In this embodiment, from the output circuit Q109, an inverted output voltage VO2 of the output voltage VO of the output circuit Q106 is obtained. That is, the differential amplifier circuit Q108 outputs the reciprocal outputs VO and VO2.

Figure 8A:
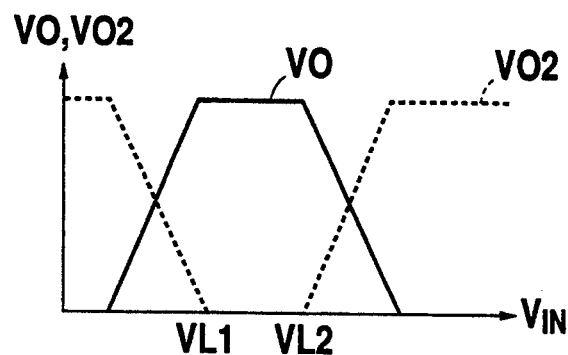
FIGS. 8A and 8B are graphical representations showing membership functions produced by the membership function generator shown in FIG. 7.

In this case, for example, when the terminals t2 and t3 are connected to each other so as to supply VIN=V2=V3 to the terminals t2 and t3, the output voltage VO of the $\pi$-type membership function symmetrical on the left and right sides and the inverted output voltage VO2 of a U-type membership function symmetrical on the left and right sides can be obtained from the output circuits Q106 and Q109, respectively, in the differential amplifier circuit Q108, as shown in FIG. 8A.

Figure 8B:
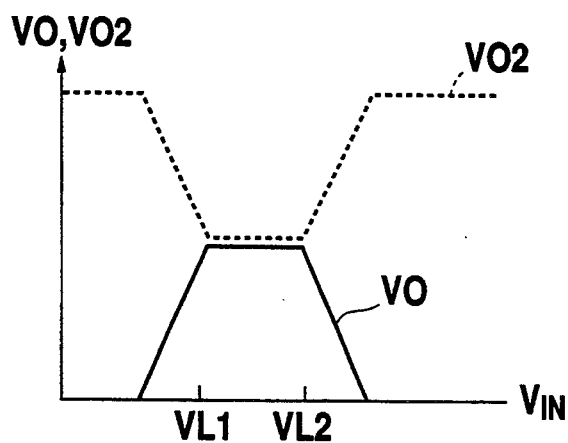

Further, by adjusting the balance between the emitter resistors RE101 and RE102 of the respective transistors Q103 and Q104, as shown in FIG. 8B, the positional relationship in the vertical direction between the output voltage VO and the inverted output voltage VO2 can be controlled.

Figure 9:
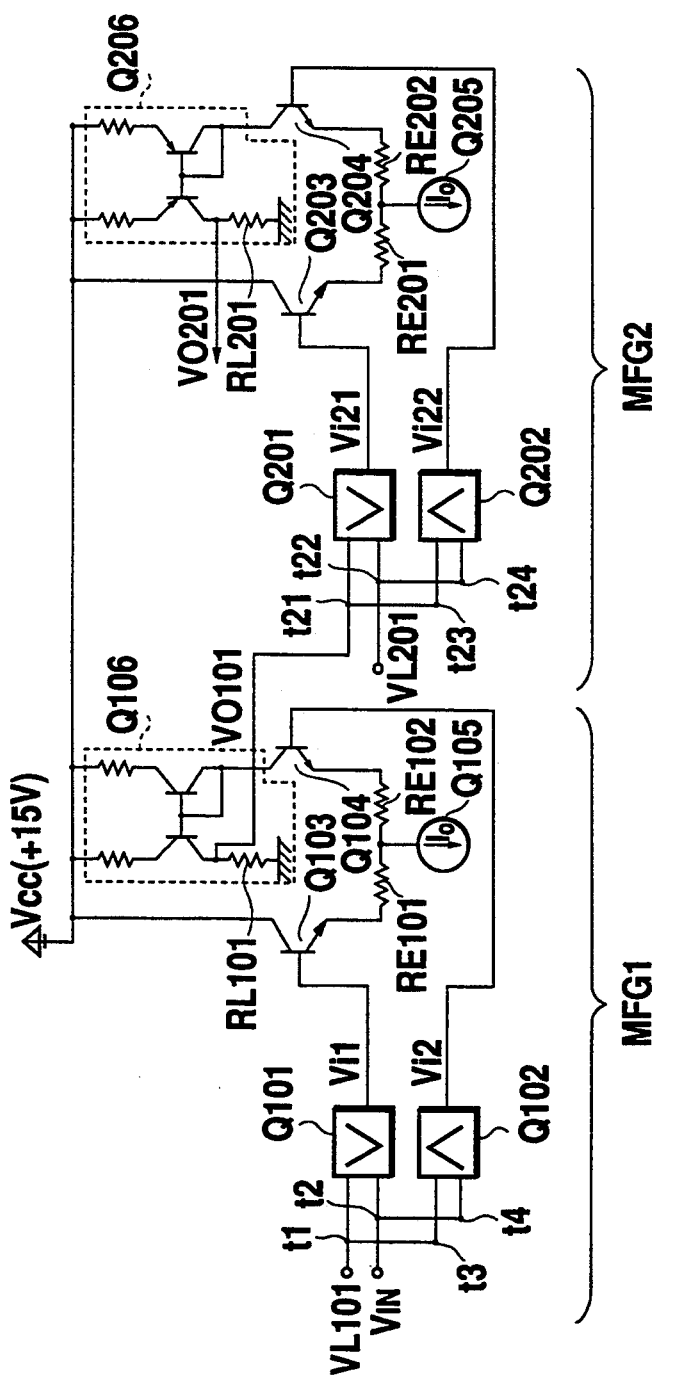
FIG. 9 is a circuit diagram of a third embodiment of a membership function generator according to the present invention.

In FIG. 9, there is shown the third embodiment of a membership function generator according to the present invention.

In this embodiment, the membership function generator is comprised of first and second membership function generators MFG1 and MFG2 connected in series, each having the same construction as the first embodiment shown in FIG. 1, and an output of the first membership function generator MFG1 is input to the second membership function generator MFG2. In this case, the first membership function generator MFG1 includes a maximum value arithmetic circuit Q101, a minimum value arithmetic circuit Q102, a pair of transistors Q103 and Q104, a pair of emitter resistors RE101 and RE102, a constant current source Q105 and an output circuit Q106 having an output resistor RL101 in the same manner as shown in FIG. 1, and the second membership function generator MFG2 includes a maximum value arithmetic circuit Q201, a minimum value arithmetic circuit Q202, a pair of transistors Q203 and Q204, a pair of emitter resistors RE201 and RE202, a constant current source Q205 and an output circuit Q206 having an output resistors RL201 in the same manner as the first membership function generator MFG1. The maximum value arithmetic circuit Q201 having two input terminals t21 and t22 outputs an output Vi21 and the minimum value arithmetic circuit Q202 having two input terminals t23 and t24 outputs an output Vi22.

Figures 10A, 10B:
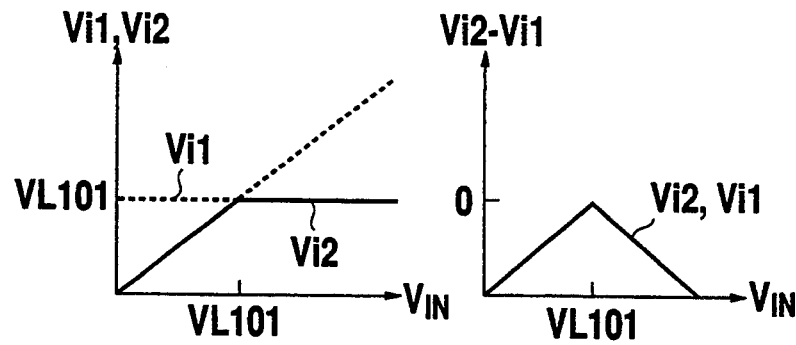
FIGS. 10A to 10F are graphical representations showing various membership functions produced by the membership function generator shown in FIG. 9.
Figures 10C, 10D:
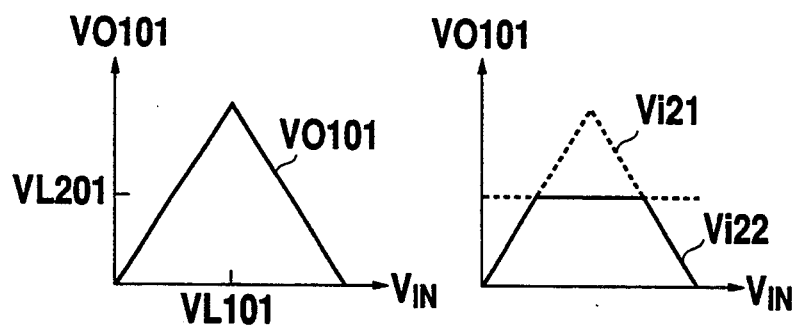

In the first membership function generator MFG1, a reference voltage VL101 is input to the terminals t1 and t3 and the inference-input VIN is input to the terminals t2 and t4. Hence, the outputs Vi1 and Vi2 of the respective maximum and minimum value arithmetic circuits Q101 and Q102 are obtained, as shown in FIG. 10A, and Vi1−Vi2 becomes as shown in FIG. 10B. Thus, an output voltage VO101 of the first membership function generator MFG1 becomes a triangular form having one peak, as shown in FIG. 10C. The output voltage VO101 is input to the terminals t21 and t23 of the second membership function generator MFG2. Also, the half of the vertex voltage of the output voltage VO101 of the first membership function generator MFG1 as a reference voltage VL201 is input to the terminals t22 and t24. Hence, the outputs Vi21 and Vi22 of the respective maximum and minimum value arithmetic circuits Q201 and Q202 are obtained, as shown in FIG. 10D, and an output voltage VO201 of the second membership function generator MFG2 is obtained as a M-type membership function having two peaks, as shown by broken lines in FIG. 10E.

In the third embodiment, although the M-type membership function is generated, by changing the reference voltages, a membership function generator having a flat peak or peaks can be produced.

Figures 10E, 10F:
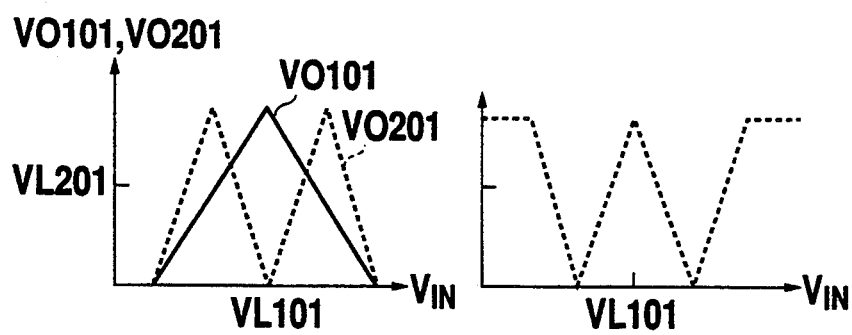

Further, the output circuit for outputting an inverted output as shown in FIG. 7 as the second membership function generator MFG2 can be used. In this case, a W-type membership function having an antiphase to the output voltage VO201 can be obtained, as shown in FIG. 10F.

Further, by increasing the number of the membership function generator circuits to be connected in series, the number of the peaks of the membership function can be increased.

As described above, according to the present invention, since the gradients of both the sides of the membership function are equal in the state the membership function generator has just produced, there is no need to carry out any adjustment or collection for adjusting the gradients of both the sides to be equal.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A membership function generator comprising:
   a maximum value selector having a plurality of first input terminals and an output terminal, wherein said maximum value selector selects and outputs a maximum voltage from a plurality of first input voltages provided to said first input terminals;
   a minimum value selector having a plurality of second input terminals and an output terminal, wherein said minimum value selector selects and outputs a minimum voltage from a plurality of second input voltages provided to said second input terminals; and
   a differential amplifier circuit having input terminals connected to the output terminals of the maximum value selector and the minimum value selector, wherein said differential amplifier circuit amplifies a difference of the voltages output from the maximum value selector and the minimum value selector to generate an amplified result as a membership function, a connected one of the plurality of first input terminals is connected to a connected one of the plurality of second input terminals, the voltage applied to the connected first and second input terminals is an inference-input voltage to form the basis of an inference and remaining ones of the plurality of first input terminals are set at a first reference voltage, and remaining ones of the plurality of second input terminals are set at a second reference voltage.

2. The membership function generator of claim 1, wherein the differential amplifier circuit outputs a $\pi$-type membership function when the first reference voltage is lower than the second reference voltage.

3. The membership function generator of claim 1, wherein the differential amplifier circuit outputs a triangular membership function when the first reference voltage is equal to the second reference voltage.

4. The membership function generator of claim 1, wherein the differential amplifier circuit includes:

a first transistor having an emitter, a collector and a base, the base of the first transistor connected to the output of the maximum value selector;

a second transistor having an emitter, a collector and a base, the base of the second transistor connected to the output of the minimum value selector;

a constant current source for supplying a predetermined sum value of current to the emitters of the first and second transistors;

a first resistor interposed between the emitter of the first transistor and the constant current source;

a second resistor interposed between the emitter of the second transistor and the constant current source; and a current mirror type output circuit connected to the collector of the second transistor, the current mirror type output circuit having a third resistor for converting a collector current of the second transistor into a voltage to output as the membership function, and when the voltage applied to the connected first and second input terminals is lower than the first reference voltage, an increase gradient, $G_1$, of the membership function with respect to the inference-input voltage is $$G_1 = R_3/(R_1+R_2)$$

and when the inference-input voltage is higher than the second reference voltage, a decrease gradient, $G_D$, of the membership function with respect to the voltage applied to the connected first and second input terminals is $$G_D = -G_I,$$

where $R_1$ is a resistance value of the first resistor, $R_2$ is a resistance value of the second resistor and $R_3$ a resistance value of the third resistor.

5. A membership function generator comprising:

a maximum value selector having a plurality of first input terminals and an output terminal, wherein said maximum value selector selects and outputs a maximum voltage from a plurality of first input voltages provided to said first input terminals;

a minimum value selector having a plurality of second input terminals and an output terminal, wherein said minimum value selector selects and outputs a minimum voltage from a plurality of second input voltages provided to said second input terminals; and a differential amplifier circuit having input terminals connected to the output terminals of the maximum value selector and the minimum value selector, wherein said differential amplifier circuit amplifies a difference of the voltages output from the maximum value selector and the minimum value selector to generate an amplified result as a membership function, one of the first input terminals is connected to all of the plurality of second input terminals, a predetermined reference voltage is input to the connected first and second input terminals, and an inference-input voltage to form the basis of an inference is applied to each of the remaining ones of the plurality of first input terminals.

6. The membership function generator of claim 5, wherein the differential amplifier circuit includes:

a first transistor having an emitter, a collector and a base, the base of the first transistor connected to the output of the maximum value selector;

a second transistor having an emitter, a collector and a base, the base of the second transistor connected to the output of the minimum value selector;

a constant current source for supplying a predetermined sum value of current to the emitters of the first and second transistors;

a first resistor interposed between the emitter of the first transistor and the constant current source;

a second resistor interposed between the emitter of the second transistor and the constant current source; and a current mirror type output circuit connected to the collector of the second transistor, the current mirror type output circuit having a third resistor for converting a collector current of the second transistor into a voltage to output as the membership function, and when the inference-input voltage is higher than the predetermined reference voltage, an increase gradient, $G_I$, of the membership function with respect to the inference-input voltage is $$G_I = -R_3/(R_1+R_2),$$

where $R_1$ is a resistance value of the first resistor, $R_2$ is a resistance value of the second resistor, and $R_3$ is a resistance value of the third resistor.

7. A membership function generator comprising:

a maximum value selector having a plurality of first input terminals and an output terminal, wherein said maximum value selector selects and outputs a maximum voltage from a plurality of first input voltages provided to said first input terminals;

a minimum value selector having a plurality of second input terminals and an output terminal, wherein said minimum value selector selects and outputs a minimum voltage from a plurality of second input voltages provided to said second input terminals; and a differential amplifier circuit having input terminals connected to the output terminals of the maximum value selector and the minimum value selector, wherein said differential amplifier circuit amplifies a difference of the voltages output from the maximum value selector and the minimum value selector to generate an amplified result as a membership function, all of the plurality of the first input terminals are connected to at least one of the plurality of second input terminals, a predetermined reference voltage is input to the connected first and second input terminals, and an inference-input voltage is applied to each of the remaining ones of the plurality of second input terminals.

8. The membership function generator of claim 7, wherein the differential amplifier circuit includes:

a first transistor having an emitter, a collector and a base, the base of the first transistor connected to the output of the maximum value selector;

a second transistor having an emitter, a collector and a base, the base of the second transistor connected to the output of the minimum value selector;

a constant current source for supplying a predetermined sum value of current to the emitters of the first and second transistors;

a first resistor interposed between the emitter of the first transistor and the constant current source;

a second resistor interposed between the emitter of the second transistor and the constant current source; and a current mirror type output circuit connected to the collector of the second transistor, the current mirror type output circuit having a third resistor for converting a collector current of the second transistor into a voltage to output as the membership function, and when the inference-input voltage is lower than the predetermined reference voltage, a decrease gradient, $G_D$, of the membership function with respect to the inference-input voltage is $$G_D = R_3/(R_1+R_2)$$

where $R_1$ is a resistance value of the first resistor, $R_2$ is a resistance value of the second resistor and $R_3$ is a resistance value of the third resistor.

9. A membership function generator comprising:

a maximum value selector having a plurality of first input terminals and an output terminal, wherein said maximum value selector selects and outputs a maximum voltage from a plurality of first input voltages provided to said first input terminals;

a minimum value selector having a plurality of second input terminals and an output terminal, wherein said minimum value selector selects and outputs a minimum voltage from a plurality of second input voltages provided to said second input terminals; and a differential amplifier circuit having input terminals connected to the output terminals of the maximum value selector and the minimum value selector, wherein said differential amplifier circuit amplifies a difference of the voltages output from the maximum value selector and the minimum value selector to generate an amplified result as a membership function, the differential amplifier circuit including:

a first transistor having an emitter, a collector and a base, the base of the first transistor connected to the output of the maximum value selector;

a second transistor having an emitter, a collector and a base, the base of the second transistor connected to the output of the minimum value selector;

a constant current source for supplying a predetermined sum value of current to the emitters of the first and second transistors;

a first resistor interposed between the emitter of the first transistor and the constant current source;

a second resistor interposed between the emitter of the second transistor and the constant current source;

a first current mirror type output circuit connected to the collector of the second transistor, the first current mirror type output circuit having a third resistor for converting a collector current of the second transistor into a voltage to output as the membership function; and a second current mirror type output circuit connected to the collector of the first transistor, the second current mirror type output circuit having a fourth resistor for converting a collector current of the first transistor into a voltage to output as a reciprocal membership function with respect to the first current mirror type output circuit, and the membership function output from the first current mirror type output circuit is either a $\pi$-type membership function or a triangular membership function, and the membership function output from the second current mirror type output circuit is either a U-type membership function or a triangular membership function.

10. The membership function generator of claim 1, wherein the differential amplifier outputs a $\pi$-type membership function when the first reference voltage is lower than the second reference voltage, the $\pi$-type membership function having symmetrically shaped left and right sides.

11. The membership function generator of claim 1, wherein the differential amplifier outputs a triangular membership function when the first reference voltage is equal to the second reference voltage, the $\pi$-type membership function having symmetrically shaped left and right sides.

* * * * *